US010021128B2

(12) United States Patent
McDougal

(10) Patent No.: US 10,021,128 B2
(45) Date of Patent: Jul. 10, 2018

(54) SYSTEMS AND METHODS FOR MALWARE NULLIFICATION

(71) Applicant: Forcepoint LLC, Austin, TX (US)

(72) Inventor: Monty D. McDougal, St. Paul, TX (US)

(73) Assignee: Forcepoint LLC, Austin, TX (US)

(*) Notice: Subject to any disclaimer, the term of this patent is extended or adjusted under 35 U.S.C. 154(b) by 53 days.

(21) Appl. No.: 15/067,259

(22) Filed: Mar. 11, 2016

(65) Prior Publication Data
US 2016/0269422 A1 Sep. 15, 2016

Related U.S. Application Data

(60) Provisional application No. 62/131,940, filed on Mar. 12, 2015.

(51) Int. Cl.
H04L 29/06 (2006.01)
H04L 12/58 (2006.01)
G06F 17/30 (2006.01)
G06F 21/56 (2013.01)

(52) U.S. Cl.
CPC ...... *H04L 63/145* (2013.01); *G06F 17/30076* (2013.01); *G06F 21/568* (2013.01); *H04L 51/08* (2013.01); *H04L 51/14* (2013.01); *H04L 63/1416* (2013.01)

(58) Field of Classification Search
CPC ....... H04L 63/145; H04L 51/08; H04L 51/14; H04L 63/1416; G06F 17/30076; G06F 21/568
USPC .......................................................... 726/23
See application file for complete search history.

(56) References Cited

U.S. PATENT DOCUMENTS

| 7,930,538 | B1* | 4/2011 | Israel | H04L 67/06 709/201 |
| 8,065,424 | B2* | 11/2011 | Foresti | G06Q 10/107 340/7.22 |
| 8,893,294 | B1 | 11/2014 | Steele, III et al. | |
| 9,749,295 | B2 | 8/2017 | McDougal | |
| 2003/0097597 | A1* | 5/2003 | Lewis | H04L 63/083 726/7 |

(Continued)

OTHER PUBLICATIONS

"U.S. Appl. No. 14/688,069, Comments on Statement of Reasons for Allowance filed Jul. 21, 2017", 1 pg.

(Continued)

*Primary Examiner* — Michael S McNally
(74) *Attorney, Agent, or Firm* — Schwegman Lundberg & Woessner, P.A.

(57) ABSTRACT

Generally discussed herein are systems, devices, and methods for malware nullification. A system can include a detect module to identify a file type of an attachment of the email, compare the identified file type to a list of unsafe file types, and in response to determining the identified file type is on the list of unsafe file types, remove the attachment from the email and forward the attachment to a database, a file converter module to receive the attachment from the detect module and convert the file to a safe file type so as to nullify malware in the attachment, an insert module to receive the file with the safe file type and replace the attachment of the email with the file with the safe file type, and a mail transfer agent to forward the email with the file with the safe file type to the client.

15 Claims, 3 Drawing Sheets

(56) References Cited

U.S. PATENT DOCUMENTS

| | | | |
|---|---|---|---|
| 2005/0010814 A1* | 1/2005 | Lim | H04L 51/12 |
| | | | 726/4 |
| 2006/0190606 A1 | 8/2006 | Kohavi | |
| 2007/0028304 A1* | 2/2007 | Brennan | G06F 21/55 |
| | | | 726/24 |
| 2007/0107059 A1* | 5/2007 | Chasin | H04L 63/126 |
| | | | 726/23 |
| 2008/0209551 A1* | 8/2008 | Treacy | G06F 21/53 |
| | | | 726/22 |
| 2008/0235239 A1 | 9/2008 | Penton et al. | |
| 2009/0064326 A1* | 3/2009 | Goldstein | H04L 63/0227 |
| | | | 726/22 |
| 2010/0192223 A1 | 7/2010 | Ismael et al. | |
| 2011/0197281 A1 | 8/2011 | Alme et al. | |
| 2011/0219450 A1* | 9/2011 | McDougal | G06F 21/56 |
| | | | 726/23 |
| 2012/0297189 A1* | 11/2012 | Hayton | H04L 9/0822 |
| | | | 713/165 |
| 2013/0173782 A1 | 7/2013 | Ragutski et al. | |
| 2015/0007312 A1 | 1/2015 | Pidathala et al. | |
| 2015/0039677 A1 | 2/2015 | Kahol et al. | |
| 2015/0096022 A1 | 4/2015 | Vincent et al. | |
| 2016/0308885 A1 | 10/2016 | Mcdougal | |

OTHER PUBLICATIONS

"U.S. Appl. No. 14/688,069, Notice of Allowance dated Apr. 25, 2017", 17 pgs.

"U.S. Appl. No. 14/688,069, Response filed Jan. 4, 2017 to Non-Final Office Action dated Nov. 14, 2016", 14 pgs.

"U.S. Appl. No. 14/688,069. Examiner Interview Summary dated Dec. 27, 2016", 3 pgs.

"U.S. Appl. No. 14/688,069, Non-Final Office Action dated Nov. 14, 2016", 19 pgs.

* cited by examiner

SYSTEMS AND METHODS FOR MALWARE NULLIFICATION

RELATED APPLICATION

This application claims the benefit of priority to U.S. Provisional Patent Application Ser. No. 62/131,940, titled "SYSTEMS AND METHODS FOR MALWARE NULLIFICATION" and filed Mar. 12, 2015, which is incorporated herein by reference in its entirety.

TECHNICAL FIELD

Embodiments discussed herein generally relate to nullifying a malware attack before it occurs. One or more embodiments relate more specifically to converting a format of a document received to a safe file format, so as to render any potential malware that was in the file ineffective.

BACKGROUND

Malware commonly enters a network enterprise through a number of vectors. One such vector is electronic mail (email). A challenge with malware analysis is figuring out a sufficient way to get access to potentially malicious content for scanning, such as without affecting network speed or other network traffic.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
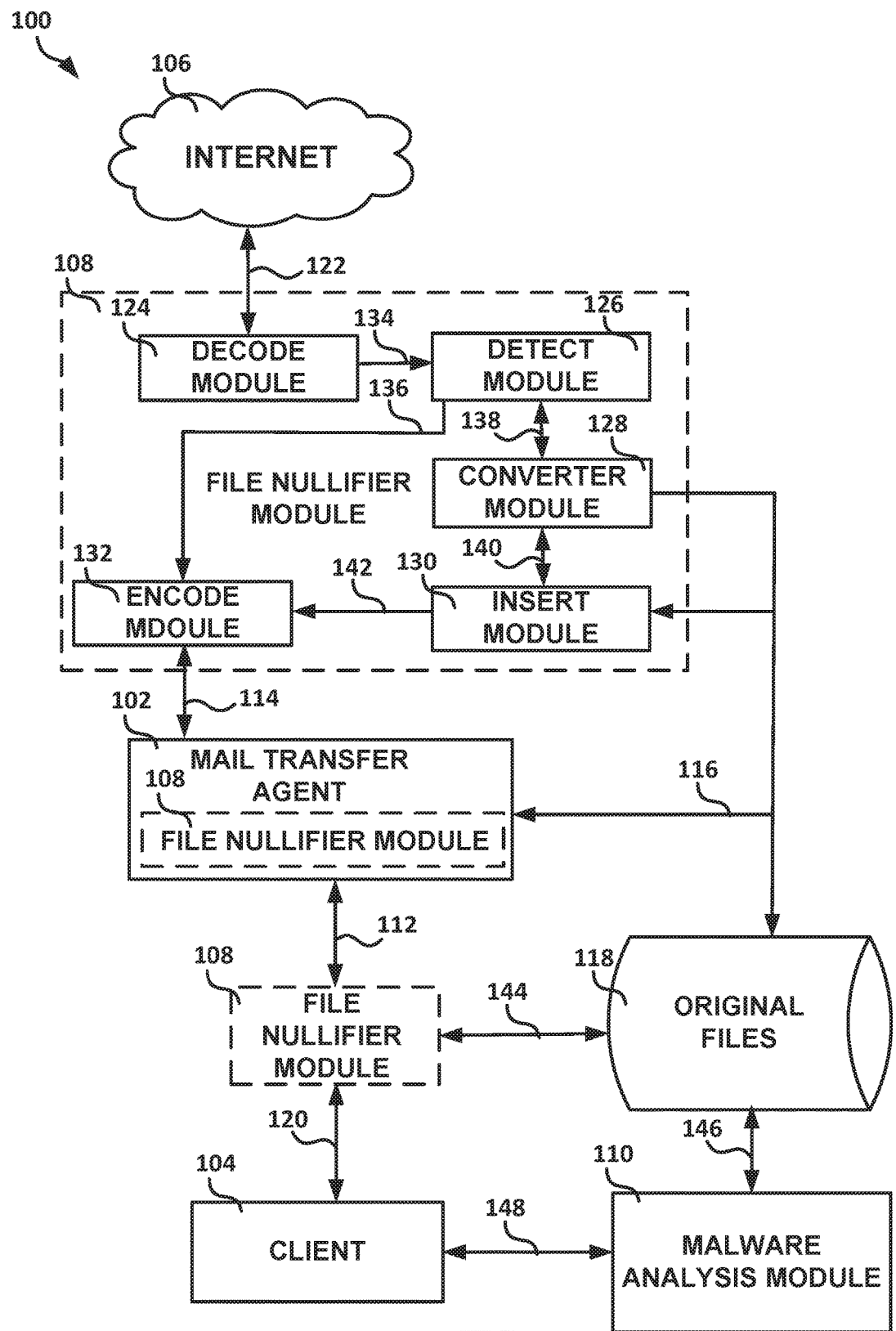
FIG. 1 illustrates, by way of example, a block diagram of an embodiment of a system for malware nullification.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments discussed herein relate to nullifying potential malware. Some embodiments relate more specifically to changing a format of a document received in an email communication to a safe file type, swapping the document in the email communication with the document in the safe file type, and forwarding the email with the document in the safe file type.

A vector of attack against a system by an Advanced Persistent Threat (APT) can include malicious Office and Portable Data Format (PDF) documents. Office is a product of Microsoft® Corporation of Redmond, Wash., U.S.A. Current malware systems attempt to detect these attacks. Systems and methods of this disclosure attempt to nullify these attacks by rewriting a file with a safer version of the file. Systems and methods discussed herein can effectively negate a large number of malware attacks. The general idea is to take a file format associated with malware (e.g., ".pdf", ".doc", or the like) and nullify any attack code which may be contained in them by rewriting the file (e.g., to a safe file format, such as a same or different format).

A file nullifier module can receive a document as input and return a modified document as an output. The modified document can include no malware, such that any malware in the received document is nullified. Such a solution provides a way to ensure files passing through a system are safe and malware free. The document conversion can be performed as a generic service. The document conversion can be performed on all documents received at a file conversion module, or only documents with a specific file extension.

Technologies for doing document conversions for MS Office and PDFs exist. For example, Microsoft Office Isolated Conversion Environment (MOICE) is available from Microsoft® Corporation to convert older versions of MS Office files to the newer XML-based formats. The newer formats of MS Office files are largely exploit free, such as can be due to the simpler file format of the extensible markup language (XML) versus the previous Object Linking and Embedding (OLE) format. For PDFs, a tool, such as PDF Creator or Acrobat from Adobe® Systems of San Jose, Calif., U.S.A., can be adapted to (e.g., automatically) re-render a PDF document using print driver mechanism. Many other tools to print or save a file to PDF exist and can be used in systems and methods discussed herein. Note that many file types, including Office documents, can be printed to a PDF document. The conversion can include printing to (e.g., saving as) a PostScript file or converting from PostScript to PDF, such as by using Ghostscript®. Many other document conversion programs exist can be used in systems and methods discussed herein.

Similar transformations of other file types such as audio, video, image files and even archive file types can be converted from one format to another format, such as to provide malware nullification. For example, a file in a .mp3 format can be converted to a .wav format (or vice versa), a file in a .bmp format can be converted to a .gif format, or a file in a .gif format can be converted to a .jpeg format, among other transformation possibilities.

In one or more embodiments, multiple files may be attached to an email, such as by including multiple files or including an archive of files (e.g., .zip). Each individual file can be analyzed, converted if the file is determined to be an unsafe file type, and replaced with a file with a safe file type. Thus, one or more of the multiple files can be replaced with files of a safe file type. In the case of an archive, the files can be replaced and re-archived, such as by an insert module (see FIG. 1) before being sent.

In one or more examples, all files received at a system, such as an email system, can be converted to a safe file format for email delivery. The file in the safe file format can be substituted for the document in the unsafe file format as part of document (e.g., email) delivery. In one or more embodiments, a link to the original document can be provided to allow the original file to be requested for download. A malware analysis can be initiated in response to a user activating the link. In one or more embodiments, the link can be provided in response to determining the document does not include malware, such as after a malware scan. The malware scan can include a heuristic scan, a signature scan, a hash scan, and/or an advanced behavioral scan.

In one or more embodiments, the download of the original file can only be completed after the file has been scanned for malware. The malware analysis, in one or more embodiments, can be performed only after the original file is requested so as to reduce the amount of work the malware scanning system performs. A preliminary malware scan can be performed on the file prior to converting the file to a safe file format, such as by a detect module (see FIG. 1). The preliminary malware scan can include a signature scan and/or a heuristic scan of the file.

In one or more embodiments, a .zip archive can be transformed to another format, such as an archive with a .7z (7-zip) extension. Such a transformation uses a different type of compression on the archive file and nullifies any potential malware in the archive. Data of an archive can be extracted therefrom and recompressed with another type of compression. In one or more embodiments, the files in the archive can be decompressed, converted to file format, and the files in the different file format can be recompressed, such as to nullify any potential malware in any of the archived files.

Systems and methods, as discussed herein can include: 1) converting a file (e.g., an untrusted file) to a safe file format, such as in an automated (i.e. without human interference after deployment) way; 2) converting files or archives of files in email traffic to another file or archive of files, such as can include another file type; 3) replacing the file(s) being sent with the converted file(s) (e.g., in live email, so as to delay the sending of the attachment, but not delay the sending of the rest of the email); 4) adding a link (e.g., to the email) that a user can activate to allow the original file to be downloaded; 5) doing on demand behavioral analysis when original file is requested; 6) a performance increase over the way malware processing is currently done by changing from trying to find the bad files to making more files good files. It is generally faster to re-render a document than it is to do a behavioral analysis on a file. Also, rendering a safe file as output could yield a file that does not open is not useable for an intended purpose, whereas malware detection is never a 100% guarantee in detecting the malware. This is particularly so since many application exploits only work on one particular version or versions of the application which a behavioral system may or may not be configured to run.

FIG. 1 illustrates, by way of example, a block diagram of an embodiment of a system 100 for malware nullification. The system 100 as illustrated includes a mail transfer agent 102 communicatively coupled between a client 104 and an internet 106. The system 100 includes an original file database 118 communicatively coupled between the mail transfer agent 102 and a malware analysis module 110. The system 100 includes a file nullifier module 108 to monitor traffic on a connection 112, 114, or through the mail transfer agent 102. The dashed boxes of the file nullifier module 108 indicate possible locations for the file nullifier module 108. As illustrated, the file nullifier module 108 can be communicatively coupled between the internet 106 and the mail transfer agent 102, can be apart of the mail transfer agent 102, or can be communicatively coupled between the mail transfer agent 102 and the client 104.

The mail transfer agent 102 acts as a middleman between the client 104 and the internet 106 to deliver email to the client 104. The mail transfer agent 102 is configured to receive email and communicate to email servers, such as by using Simple Mail Transfer Protocol (SMTP). The mail transfer agent 102 can be a Mail Transfer Agent (MTA), Mail Delivery Agent (MDA), or software that can provide email, such as using Message Handling Services (MHS).

The client 104 can be an email client that connects to the mail transfer agent 102 to retrieve or receive email therefrom. The client 104 can be one of many clients connected to the mail transfer agent 102 via a network connection (e.g., connection 112 and/or 120).

The internet 106 generally is a system of connected computer networks. The Transmission Control Protocol/Internet Protocol (TCP/IP) protocol is typically used to connect devices on the internet 106. The internet 106 as used herein refers to any network not controlled by the administrators of the network that includes the client 104. The internet 106 can be used to transfer files, email, or other communications between networks or clients.

The file nullifier module 108 monitors traffic on a connection 112, 114, 120, and/or 122, or through the mail transfer agent 102. The file nullifier module 108 can extract traffic from the traffic from the internet 106 (e.g., create a copy of the traffic and let the traffic pass, or intercept the traffic and remove a. portion of the traffic from the connection 112, 114, 120, and/or 122 or from the mail transfer agent 102).

The file nullifier module 108 as illustrated includes a decode module 124, a detect module 126, a converter module 128, an insert module 130, and an encode module 132. The decode module 124 receives email traffic from the internet 106 or the mail transfer agent 108. The decode module 124 performs a decoding of email encoded traffic, such as can be encoded in Multipurpose Internet Mail Extension (MIME) format. Decoding generally includes translating from an encoded form to another format, such as a format compatible with the detect module 126.

The decode module 124 can decrypt data, such as Secure Socket Layer (SSL) or Transport Layer Security (TLS) data, such as to help determine if the traffic includes a specified property (e.g., a file type) which is being monitored by the file nullifier module 108. The decrypted and decoded data can be provided to the detect module 126.

The detect module 126 receives the decoded traffic from the decode module 124 over the connection 134. The detect module 126 determines a file type of an attachment to the email traffic. This can be done by reading a portion of a header that identifies whether a file is present and/or the type of file present if a file is present. The detect module 126, in one or more embodiments, compares a determined file type to a list of file types that are to be converted to a safe file type. The file type can be determined by determining a file extension or using a file type determination library that analyze the actual contents of the file.

To determine the file type, the detect module 126 can identify a file name of the attachment (part of the email MIME and other email formats). This is effectively the file name including the extension that the client 104 would provide the user if the user opened the file. The detect module 126 can, additionally or alternatively, identify a MIME type set for the file. Many mail clients and web clients encode a MIME type in the meta data separate from the file extensions (but they often just use the extensions to set the file type). The detect module 126, can additionally or alternatively, analyze contents of the file for format information using a file typing libraries and/or signatures to determine file type. A file typing library can determine, based on the binary bit patterns, byte patterns, or other data structure of the file a file type which fits the contents.

The detect module 126 performing two or more of the analysis methods discussed can help determine an actual file type. It is not uncommon for a user to try to sneak a file through a system with an incorrect extension and ask a recipient to rename the file. Thus, a file with an unsafe file type can be spoofed through the system if the detect module 126 only looks at the extension type in the email through the title in the header or an extension type in the header information. The detect module 126 can be more certain about the contents of a file by analyzing the file type and the contents of the file. In one or more embodiments, any files with contents that are determined to have contents in a format that does not match a file type in the name of file or in the file type header information can be determined to be an unsafe file type. In one or more embodiments, if any of the file name, file type in the header, or contents of the header indicate that the file is an unsafe file type, the file can be considered an unsafe file type.

Some common file types appropriate for such transformations can include, but are not limited to ".pdf". ".doc", ".docx", ".ppt". ".pptx", ".txt", ".jpeg". ".img", ".wav", ".png", ".gif", ".bmp" ".html", ".tar", ".gz", ".zip", ".mp3", ".mp4", ".xl", ".xls", ".csv", ".zip", etc. If the file detect module 126 identifies that the file type is on the list, than the file (e.g., along with other data traffic corresponding to the email) can be forwarded to the converter module 128. If the file detect module 126 identifies that the file type is not on the list, than the traffic corresponding to the email can be forwarded to the encode module 132, such as with the original attachment.

In one or more embodiments, the detect module 126 performs some less computationally intensive malware analysis on one or more of the files. Less computationally intense malware analysis can include a signature and/or hash analysis as described elsewhere herein. A behavioral analysis is more computationally demanding than the signature, heuristic, and hash analyses.

The file converter module 128 converts the file to a safe file type. The safe file type may or may not be associated with a different file extension or a same file extension as the file extension of the attachment. For example, the attachment can be a portable data format (PDF) document and the file with the safe file type can be a postscript or PDF document. In another example, the attachment includes a ".doc", ".docx", ".ole", or other Office extension and the safe file type includes a ".pdf", ".docx", "xml", or other file extension.

The file converter module 128 can initiate a write operation to the original files database 118 to store the original attachment in the original files database 118. In response to writing the file to the database, the original files database 118 can provide data to the insert module 130 indicating a location at which the original file is stored (e.g., one or more entry addresses in the database, or a pointer to a location in original files database 118 at which the location of the attachment is stored).

The converter module 128 can convert a file transmitted through the traffic to a PDF, such as by printing the document to or saving the document as a PDF. In another example, the converter module 128 can convert those files with a ".doc" and/or a ".pdf" extension to a file with a file extension ".docx" or a ".pdf" (e.g., by using MOICE or by saving or printing to PDF). By converting the file to another file, any potential malware in the file can be nullified.

The insert module 130 receives the file with the safe file type from the converter module 128 (e.g., over connection 140), decoded email traffic data corresponding to the email from which the attachment originated (e.g., from the converter module 128, the detect module 126, or the decode module 124), and/or the data indicating the location of where the attachment is stored in the original files database 118. The insert module 130 then creates an email with the original attachment removed and with the file with the safe file type in its place. In one or more embodiments, the insert module 130 adds a link (e.g., a hyperlink, uniform resource locator, or the like) to the email no that a user can retrieve or request to retrieve the original attachment from the original files database 118. The link can be in the header, body, or other portion of the email. The email from the insert module 130 can be provided to the encode module 132, such as over the connection 142.

The encode module 132 encodes the email into the format in which the email was received at the decode module 124. The encode module 132 can encrypt data that was received in an encrypted format, such as the same encrypted format as received at the decode module 124.

The connection 112, 114, 116, 120, 122, 134, 136, 138, 140, 142, 144, 146, and/or 148 can be a wired, wireless, or virtual coupling between items. A wired coupling can include Ethernet, coaxial cable, universal serial bus (USB), other wired connection, or a combination thereof, among others. A wireless coupling between items can include a communication using a radio. A virtual coupling can include data being transferred from one software program to another or between functions of the same software program, such as by accessing a memory register populated by the software program or function.

In one or more embodiments, the file can be converted to another file for every file detected in the traffic. In such embodiments, the detect module 126 is superfluous and may not be included.

The insert module 130 can alter the traffic including the file to include a link that can be activated by a user to retrieve the original file. In response to activating the link, the malware analysis module 110 can retrieve the original file from the original files database 118 and perform a malware analysis on the file.

The database 118 is communicatively connected between the file nullifier module 108 and the malware analysis module 110 (e.g., by the connections 144 and 146). The database 118 receives the original files from the file nullifier module 108 and stores them in the database 118. The database 118 in one or more embodiments, provides data indicating a location of the stored attachment (or a location from which the location of the stored attachment can be determined) to the insert module 130.

In one or more other embodiments, the malware analysis module 110 can perform a malware analysis on data from the original file database 118. The malware analysis module 110 can perform one or more of a signature analysis, a heuristic analysis, a behavioral analysis, and/or a hash analysis on the data received. In one or more embodiments, the malware analysis module 110 can perform malware analysis on a file only after an associated link has been activated and/or while the user waits for the file to be downloadable. In one or more embodiments, the malware analysis module 110 can queue the files to be analyzed for malware and perform the malware analysis, such as before the user activates the link. If a user activates the link before the malware analysis module 110 has performed a malware analysis of the file associated with the link, that file can be prioritized and skip ahead in the queue. If the malware analysis module 110 determines that the file includes malware, a communication (e.g., an email, chat message, or other communication) can be provided to the client indicating that the file includes malware and will not be released. If the malware analysis module 110 determines that the file does not include malware, the file can be provided to the client 104.

A signature analysis includes determining if content includes a specific bit or byte pattern. For example, the bit sequence "1100110011001100" can be associated with malware. The malware analysis module 110 can determine if the content includes that bit sequence, and if it is not detected, the malware analysis module 110 can determine that the content does not include malware based on the signature analysis.

A heuristic analysis is a method of detecting a variant of known malware or a new type of malware. As malware mutates or is changed (e.g., to attack a different system type or to get through malware detection software) the code or signature of the malware changes. Families of malware, however, retain commonalities with other malware in the family. These commonalities can be detected by creating a single signature that encapsulates the similarities between the malware in the family with one or more non-contiguous code identifiers (e.g., wild card characters) where differences between members of the malware family occur. A malware detection scheme can thus detect if content is a member of the family regardless of differing code inserted in place of the wild card(s).

A fuzzy hash analysis includes determining a plurality of hash values (e.g., a checksum, and MD5 hash, an SHA1 hash, or other hash) on portions of the contents and/or metadata of the file and comparing the determined hash value(s) to hash values of a document known to be malware. If a specified number or percentage of the determined hash value(s) matches hash values of a file known to be malware, the file can be determined to include malware. Fuzzy hash analysis can include hashing content of a file in a sliding window or in blocks.

A behavioral analysis includes executing commands of content, such as in an isolated (.g., virtual) environment and monitoring the commands as they are performed. If the commands performed exhibit typical malware type behavior (s), the content can be considered malware. Behavioral analysis can take a significant amount of time (minutes or even hours) to perform. Thus, delaying a content request from the client 104 until behavioral analysis is complete can cause frustration among users.

Figure 2:
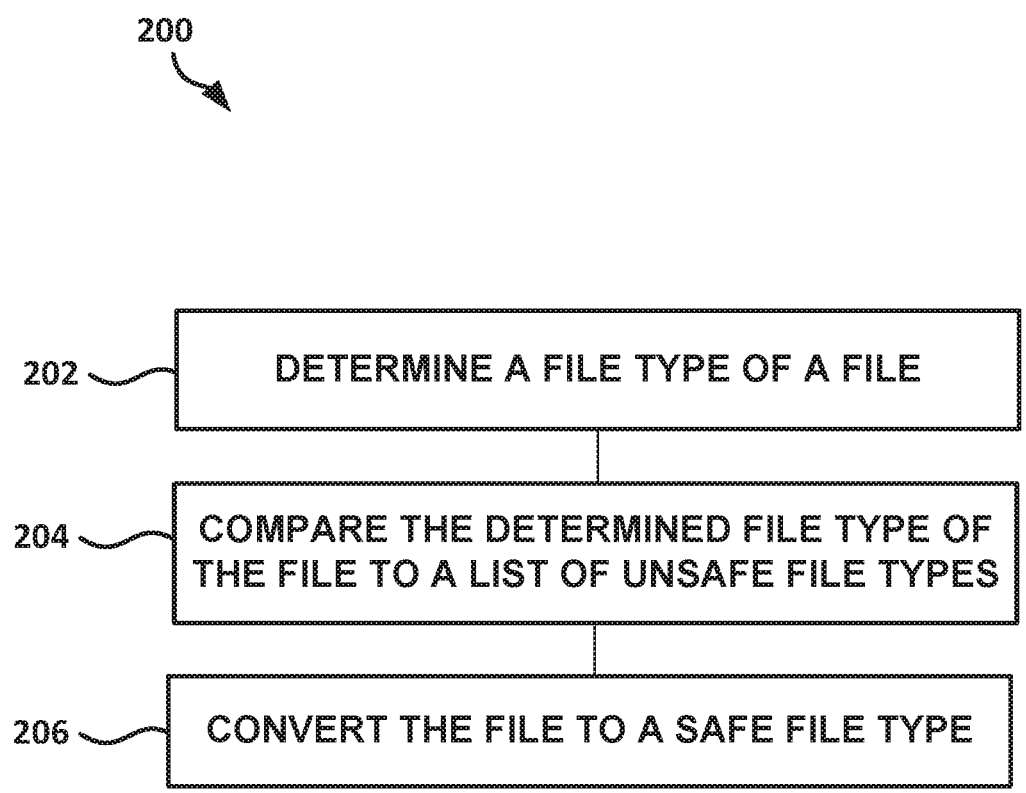
FIG. 2 illustrates, by way of example, a block diagram of an embodiment of a method for malware nullification.

FIG. 2 illustrates, by way of example, a flowchart of an embodiment of a method 200. The method 200 as illustrated includes determining a file type of a file, at operation 202; comparing the determined file type of the file to a list of unsafe file types, at operation 204; and converting the file to a safe file type, at operation 206. The file can be a file in email traffic (e.g., from an external network). The operation at 206 can be performed in response to determining the file of the file matches a file type on the list of unsafe file types.

The method 200 can further include, before the operation at 202, receiving the file as an attachment in an email communication before determining the file type of the file. The email communication can be received at, for example, the mail transfer agent 102 (FIG. 1), or at a file nullifier module 108 between the internet 106 and the mail transfer agent 102 or between the client 104 and the mail transfer agent 102 (FIG. 1). The unsafe file type can be a Microsoft® Office Object Linking and Embedding (OLE) based file type or a PDF file type. The safe file type can be a Microsoft® Office extensible markup language (XML) based file type or a PDF file type. The operation at 206 can include printing the file to a PDF to convert the file to a PDF file.

The method 200 can further include replacing the file with the unsafe file type (e.g., in the email communication). The method 200 can further include forwarding the web traffic or the email communication with the safe file type to the client 104 (FIG. 1). The method 200 can further include providing a link to the file with the unsafe file type in the email communication, such as after the malware analysis has been performed on the file with the unsafe file type and the file with the unsafe file type is determined to not include malware. The method 200 can further include performing a malware analysis on the file with the unsafe file type including at least one of a signature analysis, a heuristic analysis, a hash analysis, and a behavioral analysis in response to the link in the email communication being activated. The method 200 can further include completing a download of the file only after the malware analysis is completed.

Figure 3:
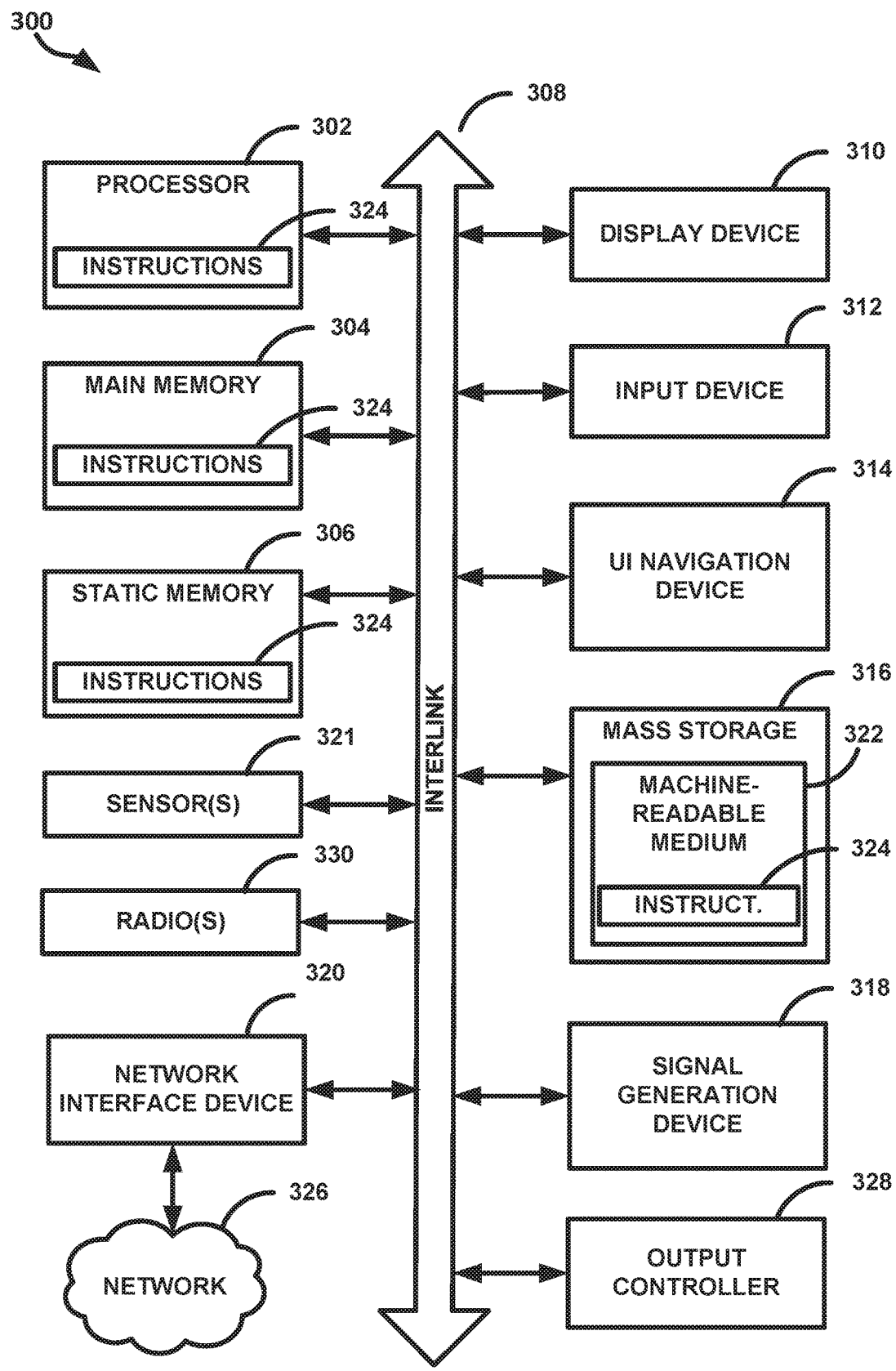
FIG. 3 illustrates, by way of example, a diagram of an embodiment of processing circuitry on which one or more of the methods and/or processes discussed herein may be performed.

FIG. 3 illustrates, by way of example, a block diagram of an embodiment of a machine 300 on which one or more of the operations as discussed herein can be implemented. The machine 300 can include a computing device instantiated as a compute device or server. The machine 300 may be employed to host or be integral to hardware, software, and/or firmware that performs malware analysis. One or more of the client 104, the file nullifier module 108, malware analysis module 110, original files database 118, decode module 124, detect module 126, converter module 128, insert module 130, and encode module 132, can include one or more of the items of the machine 300. In one or more embodiments, one or more of the client the client 104, the file nullifier module 108, malware analysis module 110, original files database 118, decode module 124, detect module 126, converter module 128, insert module 130, and encode module 132 can be implemented using one or more items of the machine 300. In alternative embodiments, the machine 300 operates as a standalone device or may be connected (e.g., networked) to other machines. In a networked deployment, the machine 300 may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 300 includes a processor 302 (e.g., a central processing unit (CPU), a graphics processing unit (GPU) or both), a main memory 304 and a static memory 306, which communicate with each other via a bus 308. The machine 300 may further include a video display unit 310 (e.g., a liquid crystal display (LCD) or a cathode ray tube (CRT)). The machine 300 may include an alphanumeric input device 312 (e.g., a keyboard), a user interface (UI) navigation device 314 (e.g., a mouse), a disk drive unit 316, a signal generation device 318 (e.g., a speaker) and a network interface device 320.

The memory 304 or 306 are examples of a storage device that can include instructions stored thereon that are executed by a machine, such as a. processor or other processing circuitry, and cause the machine to perform operations. The storage device can be programmed and maintained prior to its inclusion in a system. The instructions and other information can be encrypted or otherwise protected by one or more security measures, such as to help protect the operational boundaries and other data stored thereon.

The disk drive unit 316 as illustrated includes a machine-readable medium 322 on which is stored one or more sets of instructions and data structures (e.g., software) 324 embodying or utilized by any one or more of the methodologies or operations described herein. The instructions 324 may also reside, completely or at least partially, within the main memory 304 and/or within the processor 302 during execution thereof by the machine 300, the main memory 304 and the processor 302 also including machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may he configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may he implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, or other electric or electronic components) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios 330, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The modules can be implemented with the division of operations as explained herein or the division of operations can be different such that a single module implements one or more of the operations of two or more of the modules or multiple modules implement the operations of one of the modules.

EXAMPLES AND ADDITIONAL NOTES

Example 1 can include or use subject matter (such as an apparatus, a method, a means for performing operations, or a machine readable memory including instructions that, when performed by the machine, can configure the machine to perform acts), such as can include or use a system for malware nullification, the system comprising a mail transfer agent communicatively coupled between a client and the internet, the mail transfer agent to transfer email to a client, a detect module comprising processing circuitry communicatively coupled to the mail transfer agent, the detect module to identify a file type of an attachment of the email, compare the identified file type to a list of unsafe file types, and in response to determining the identified file type is on the list of unsafe file types, remove the attachment from the email and forward the attachment to a database, a file converter module comprising processing circuitry communicatively coupled to the detect module, the file converter module to receive the attachment from the detect module and convert the file to a safe file type so as to nullify malware in the attachment, the safe file type including a same or different file type, an insert module comprising processing circuitry communicatively coupled to the file converter module, the insert module to receive the file with the safe file type and replace the attachment of the email with the file with the safe file type, and wherein the mail transfer agent is further to forward the email with the file with the safe file type as an attachment to the email to the client.

Example 2 can include or use, or can optionally be combined with the subject matter of Example 1, to include or use, the database, the database to provide an indication of a location at which the attachment is stored to the insert module, and wherein the processing circuitry of the insert module further to provide a link to the attachment in the email.

Example 3 can include or use, or can optionally be combined with the subject matter of Example 2, to include or use a malware analysis module communicatively coupled to the database, the malware analysis module including processing circuitry to determine whether the attachment includes malware.

Example 4 can include or use, or can optionally be combined with the subject matter of Example 3, to include or use, wherein the processing circuitry of the malware analysis module is further to determine whether the attachment includes malware in response to the user activating the link in the email.

Example 5 can include or use, or can optionally be combined with the subject matter of Example 4, to include or use, wherein the processing circuitry of the malware analysis module is further to forward the attachment to the client (e.g., in an email) in response to determining the attachment does not include malware.

Example 6 can include or use, or can optionally be combined with the subject matter of Example 5, to include or use, wherein the processing circuitry of the malware analysis module is further to, in response to determining the attachment includes malware, refrain from forwarding the attachment and provide a communication to the client indicating that the attachment includes malware.

Example 7 can include or use, or can optionally be combined with the subject matter of Example 6, to include or use, wherein the attachment is (1) a file with a .doc, .ppt, .pot, .pps, .xls, .xlt, .xla extension and the safe file type is an extensible markup language (XML) format document, (2) a file with .ole extension and the safe file type is an XML file type, or (3) a file with a .pdf extension and the safe file type is a portable data format (PDF) document.

Example 8 can include or use, or can optionally be combined with the subject matter of Example 7, to include or use, wherein the attachment is a file with a .pdf extension and the safe file type is a portable data format (PDF) document, and wherein the file converter module prints the file with the .pdf extension to the PDF document to create the file with the safe file type.

Example 9 can include or use, or can optionally be combined with the subject matter of Example 6, to include or use, wherein the safe file type is a postscript document or the PDF document and the file converter module prints the file with the unsafe file type to the postscript document or PDF document, respectively.

Example 10 can include or use subject matter (such as an apparatus, a method, a means for performing operations, or a machine readable memory including instructions that, when performed by the machine, can configure the machine to perform acts), such as can include or use determining, using processing circuitry of a detect module, a file type of a file by interpreting information in a header of email traffic, comparing, using the processing circuitry, the determined file type of the file to a list of unsafe file types, in response to determining the determined file type is an unsafe file type, converting, using processing circuitry of a converter module communicatively coupled to the detect module, the file to a safe file type, wherein the safe file type is a same or different file type of the safe file type, storing the file with the unsafe file type in a database, and removing, using processing circuitry of an insert module communicatively coupled to the converter module, the file with the unsafe file type from the email traffic, inserting the file with the safe file type in the email traffic, and providing the email traffic with the file with the safe file type to a client.

Example 11 can include or use, or can optionally be combined with the subject matter of Example 10, to include or use performing, using processing circuitry of a malware analysis module communicatively coupled to the database, a malware analysis on the file with the unsafe file type, the malware analysis including at least one of a signature analysis, a heuristic analysis, a hash analysis, and a behavioral analysis.

Example 12 can include or use, or can optionally be combined with the subject matter of Example 11, to include or use inserting into the email traffic that includes the file with the safe file type, using the processing circuitry of the insert module, a link that, when activated by a user, initiates the malware analysis by the malware analysis module.

Example 13 can include or use, or can optionally be combined with the subject matter of Example 12, to include or use in response to determining the user has activated the link in the email, performing, using the processing circuitry of the malware analysis module, the malware analysis, in response to determining, based on the malware analysis, that the file with the unsafe file type includes malware, providing a communication, using the processing circuitry of the malware analysis module, to the client indicating that the file includes malware and will not be released, and in response to determining based on the malware analysis, that the file with the unsafe file type does not include malware, providing the file with the unsafe file type to the client.

Example 14 can include or use, or can optionally be combined with the subject matter of at least one of Examples 10-13, to include or use, wherein the file with the unsafe file type is an archive file and the safe file type is a file type with a different form of compression than that used to create the archive file.

Example 15 can include or use, or can optionally be combined with the subject matter of at least one of Examples 10-13, to include or use, wherein the file with the unsafe file type is a file with a .pdf extension and the safe file type is a portable data format (PDF) document, and wherein the processing circuitry of the file converter module prints the file with the .pdf extension to the PDF document to create the file with the safe file type.

Example 16 can include or use subject matter (such as an apparatus, a method, a means for performing operations, or a machine readable memory including instructions that, when performed by the machine, can configure the machine to perform acts), such as can include or use anon-transitory machine-readable medium including instructions stored thereon that, when executed by processing circuitry of a machine, cause the processing circuitry to perform operations for malware nullification, the operations comprising determining a file type of a file by interpreting information in a header of email traffic, comparing the determined file type of the file to a list of unsafe file types, in response to determining the determined file type is an unsafe file type, converting the file to a safe file type, wherein the safe file type is a same or different file type of the safe file type, writing the file with the unsafe file type to a database, and removing the file with the unsafe file type from the email traffic, inserting the file with the safe file type in the email traffic, and providing the email traffic with the file with the safe file type to a client.

Example 17 can include or use, or can optionally be combined with the subject matter of Example 16, to include or use instructions that, when executed by the processing circuitry, configure the processing circuitry to perform further operations comprising performing a malware analysis on the file with the unsafe file type, the malware analysis including at least one of a signature analysis, a heuristic analysis, a hash analysis, and a behavioral analysis.

Example 18 can include or use, or can optionally be combined with the subject matter of Example 17, to include or use instructions that, when executed by the machine, configure the processing circuitry to perform further operations comprising inserting into the email traffic that includes the file with the safe file type a link that, when activated by a user, initiates the malware analysis by the malware analysis module.

Example 19 can include or use, or can optionally be combined with the subject matter of Example 18, to include or use instructions that, when executed by the machine, configure the processing circuitry to in response to determining the user has activated the link in the email, performing the malware analysis, in response to determining, based on the malware analysis, that the file with the unsafe file type includes malware, providing a communication to the client indicating that the file includes malware and will not be released, and in response to determining based on the malware analysis, that the file with the unsafe file type does not include malware, allowing the client to download the file with the unsafe file type.

Example 20 can include or use, or can optionally be combined with the subject matter of at least one of Examples 16-19, to include or use wherein the file with the unsafe file type is (1) a file with a .doc, .ppt, .pot, .pps, .xls, .xlt, .xla extension and the safe file type is an extensible markup language (XML) format document, (2) a file with .ole extension and the safe file type is an XML file type, or (3) a file with a .pdf extension and the safe file type is a portable data format (PDF) document.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for malware nullification, the system comprising:
a mail transfer agent communicatively coupled between a client and the internet, the mail transfer agent to transfer email to a client;
a detect module comprising processing circuitry communicatively coupled to the mail transfer agent, the detect module to identify a file type of an attachment of the email, compare the identified file type to a list of unsafe file types, and in response to determining the identified file type is on the list of unsafe file types, remove the attachment from the email and forward the attachment to a database;
a file converter module comprising processing circuitry communicatively coupled to the detect module, the file converter module to receive the attachment from the detect module and convert the file to a safe file type so as to nullify malware in the attachment, the safe file type including a same or different file type;
an insert module comprising processing circuitry communicatively coupled to the file converter module, the insert module to receive the file with the safe file type and replace the attachment of the email with the file with the safe file type, wherein at least one of (a) the attachment is (1) a file with a .doc, .ppt, .pot, .pps, .xls, .xlt, .xla extension and the safe file type is an extensible markup language (XML) format document, (2) a file with .ole extension and the safe file type is an XML file type, or (3) a file with a .pdf extension and the safe file type is a portable data format (PDF) document, and (b) the safe file type is a postscript document or the PDF document and the file converter module prints the file with the unsafe file type to the postscript document or PDF document, respectively; and
wherein the mail transfer agent is further to forward the email with the file with the safe file type as an attachment to the email to the client.

2. The system of claim 1, further comprising:
the database, the database to provide an indication of a location at which the attachment is stored to the insert module;
the processing circuitry of the insert module further to provide a link to the attachment in the email.

3. The system of claim 2, further comprising:
a malware analysis module communicatively coupled to the database, the malware analysis module including processing circuitry to determine whether the attachment includes malware.

4. The system of claim 3, wherein the processing circuitry of the malware analysis module is further to determine whether the attachment includes malware in response to the user activating the link in the email.

5. The system of claim 4, wherein the processing circuitry of the malware analysis module is further to forward the attachment to the client in response to determining the attachment does not include malware.

6. The system of claim 5, wherein the processing circuitry of the malware analysis module is further to, in response to determining the attachment includes malware, refrain from forwarding the attachment and provide a communication to the client indicating that the attachment includes malware.

7. The system of claim 1, wherein the attachment is a file with a .pdf extension and the safe file type is a portable data format (PDF) document, and wherein the file converter module prints the file with the .pdf extension to the PDF document to create the file with the safe file type.

8. A method comprising:
determining, using processing circuitry of a detect module, a file type of a file by interpreting information in a header of email traffic;
comparing, using the processing circuitry, the determined file type of the file to a list of unsafe file types;
in response to determining the determined file type is an unsafe file type, converting, using processing circuitry of a converter module communicatively coupled to the detect module, the file to a safe file type, wherein the safe file type is a same or different file type of the safe file type;
storing the file with the unsafe file type in a database; and
removing, using processing circuitry of an insert module communicatively coupled to the converter module, the file with the unsafe file type from the email traffic;
inserting the file with the safe file type in the email traffic, wherein at least one of (a) the file with the unsafe file type is an archive file and the safe file type is a file type with a different form of compression than that used to create the archive file and (b) the file with the unsafe file type is a file with a .pdf extension and the safe file type is a portable data format (PDF) document, and wherein the processing circuitry of the file converter module prints the file with the .pdf extension to the PDF document to create the file with the safe file type; and
providing the email traffic with the file with the safe file type to a client.

9. The method of claim 8, further comprising performing, using processing circuitry of a malware analysis module communicatively coupled to the database, a malware analysis on the file with the unsafe file type, the malware analysis including at least one of a signature analysis, a heuristic analysis, a hash analysis, and a behavioral analysis.

10. The method of claim 9, further comprising:
inserting into the email traffic that includes the file with the safe file type, using the processing circuitry of the insert module, a link that, when activated by a user, initiates the malware analysis by the malware analysis module.

11. The method of claim 10, further comprising:
in response to determining the user has activated the link in the email, performing, using the processing circuitry of the malware analysis module, the malware analysis;
in response to determining, based on the malware analysis, that the file with the unsafe file type includes malware, providing a communication, using the processing circuitry of the malware analysis module, to the client indicating that the file includes malware and will not be released; and
in response to determining based on the malware analysis, that the file with the unsafe file type does not include malware, providing the file with the unsafe file type to the client.

12. A non-transitory machine-readable medium including instructions stored thereon that, when executed by processing circuitry of a machine, cause the machine to perform operations for malware nullification, the operations to configure the processing circuitry to:
determine a file type of a file by interpreting information in a header of email traffic;
compare the determined file type of the file to a list of unsafe file types;

in response to determining the determined file type is an unsafe file type, converting the file to a safe file type, wherein the safe file type is a same or different file type of the safe file type;

write the file with the unsafe file type to a database; and remove the file with the unsafe file type from the email traffic;

insert the file with the safe file type in the email traffic, wherein the file with the unsafe file type is (1) a file with a .doc, .ppt, .pot, .pps, .xls, .xlt, .xla extension and the safe file type is an extensible markup language (XML) format document, (2) a file with .ole extension and the safe file type is an XML file type, or (3) a file with a .pdf extension and the safe file type is a portable data format (PDF) document; and provide the email traffic with the file with the safe file type to a client.

13. The non-transitory machine-readable medium of claim 12, further comprising instructions that, when executed by the processing circuitry, configure the processing circuitry to perform further operations comprising performing a malware analysis on the file with the unsafe file type, the malware analysis including at least one of a signature analysis, a heuristic analysis, a hash analysis, and a behavioral analysis.

14. The non-transitory machine-readable medium of claim 13, further comprising instructions that, when executed by the machine, configure the processing circuitry to perform further operations comprising inserting into the email traffic that includes the file with the safe file type a link that, when activated by a user, initiates the malware analysis by the malware analysis module.

15. The non-transitory machine-readable medium of claim 14, further comprising instructions that, when executed by the machine, configure the processing circuitry to:

in response to determining the user has activated the link in the email, performing the malware analysis;

in response to determining, based on the malware analysis, that the file with the unsafe file type includes malware, providing a communication to the client indicating that the file includes malware and will not be released; and in response to determining based on the malware analysis, that the file with the unsafe file type does not include malware, allowing the client to download the file with the unsafe file type.

* * * * *

UNITED STATES PATENT AND TRADEMARK OFFICE
CERTIFICATE OF CORRECTION

PATENT NO. : 10,021,128 B2
APPLICATION NO. : 15/067259
DATED : July 10, 2018
INVENTOR(S) : Monty D. McDougal Page 1 of 2

It is certified that error appears in the above-identified patent and that said Letters Patent is hereby corrected as shown below:

On the Title Page

On page 2, in Column 2, under "Other Publications", Line 5, delete "14/688,069." and insert --14/688,069,-- therefor In the Specification In Column 2, Line 34, delete "he" and insert --be-- therefor In Column 2, Line 44, delete ".way" and insert --.wav-- therefor In Column 3, Line 59, delete "apart" and insert --a part-- therefor In Column 4, Line 21, delete "a." and insert --a-- therefor In Column 4, Line 28, delete "108." and insert --102.-- therefor In Column 5, Line 18, delete "".pdf"." and insert --".pdf",-- therefor In Column 5, Line 19, delete "".ppt"." and insert --".ppt",-- therefor In Column 5, Line 19, delete "".jpeg"." and insert --".jpeg",-- therefor In Column 5, Line 20, delete "".bmp"" and insert --".bmp",-- therefor In Column 5, Line 44, delete ""xml"," and insert --".xml",-- therefor In Column 6, Line 7, delete "no" and insert --so-- therefor Signed and Sealed this
Twenty-fifth Day of June, 2019

Andrei Iancu
*Director of the United States Patent and Trademark Office*

In Column 7, Line 36, delete "(.g.," and insert --(e.g.,-- therefor

In Column 8, Line 58, delete "a." and insert --a-- therefor

In Column 9, Line 48, delete "he" and insert --be-- therefor

In Column 9, Line 57, delete "he" and insert --be-- therefor

In Column 9, Line 64, delete "integrated" and insert --Integrated-- therefor